(12) United States Patent
Kokubo (10) Patent No.: US 7,352,188 B2
(45) Date of Patent: Apr. 1, 2008

(54) ELECTRICALLY OPERATED VEHICLE ABNORMALITY JUDGING DEVICE

(75) Inventor: Harukatsu Kokubo, Aichi-ken (JP)

(73) Assignee: Aisin AW Co., Ltd., Aichi-ken (JP)

( * ) Notice: Subject to any disclaimer, the term of this patent is extended or adjusted under 35 U.S.C. 154(b) by 111 days.

(21) Appl. No.: 11/073,595

(22) Filed: Mar. 8, 2005

(65) Prior Publication Data

US 2005/0212474 A1    Sep. 29, 2005

(30) Foreign Application Priority Data

Mar. 12, 2004   (JP)   ............................. 2004-070905

(51) Int. Cl.
*G01R 31/00*   (2006.01)
*G01R 31/02*   (2006.01)
(52) U.S. Cl. ...................... 324/503; 318/490
(58) Field of Classification Search ................. 324/503
See application file for complete search history.

(56) References Cited

U.S. PATENT DOCUMENTS 5,510,687 A * 4/1996 Ursworth et al. ........... 318/727
6,137,418 A * 10/2000 Zuercher et al. ............ 340/648
6,930,490 B2 * 8/2005 Saunders et al. ........... 324/511
2004/0130326 A1 * 7/2004 Yamamoto ................. 324/503

FOREIGN PATENT DOCUMENTS

JP    08-088981    *  4/1996
JP    8-88981 A       4/1996

* cited by examiner

*Primary Examiner*—Andrew H. Hirshfeld
*Assistant Examiner*—Jeff Natalini
(74) *Attorney, Agent, or Firm*—Sughrue Mion, PLLC (57) ABSTRACT

An electrically operated vehicle abnormality judging device. The invention has an electrically operated machine, a driving signal generation processing section for generating a driving signal by receiving a command value, an inverter for receiving the driving signal and generating and supplying an electric current to the electrically operated machine, a line for driving for connecting the driving signal generation processing section and the inverter, a line for judgment branched from the line for driving and connected to a power source, and an abnormality judgment processor for judging whether an abnormality is generated in the line for driving on the basis of a signal of the line for judgment.

5 Claims, 4 Drawing Sheets

ELECTRICALLY OPERATED VEHICLE ABNORMALITY JUDGING DEVICE

BACKGROUND OF THE INVENTION

This application claims the priority of Japanese Patent Application No. 2004-070905, filed Mar. 12, 2004 in the Japan Patent Office, the disclosure of which is incorporated herein by reference in its entirety.

FIELD OF THE INVENTION

The present invention relates to an electrically operated vehicle abnormality judging device.

DESCRIPTION OF THE RELATED ART

Conventionally, in a vehicle drive unit mounted to an electric automobile as an electrically operated vehicle and generating drive motor torque as torque of a drive motor arranged as an electrically operated machine and transmitting the drive motor torque to a drive wheel, the drive motor is driven by receiving a direct electric current from a battery at a power applying (driving) time and generates the drive motor torque. At a regenerative (power generating) time, the drive motor receives the torque by inertia of the electric automobile and generates the direct electric current and supplies this direct electric current to the battery.

A planetary gear unit having a sun gear, a ring gear and a carrier is arranged in a vehicle drive unit mounted to a hybrid type vehicle as the electrically operated vehicle and transmitting one portion of engine torque as torque of an engine to an electric generator (electric generator motor) arranged as a first electrically operated machine and also transmitting the remaining engine torque to the drive wheel. The carrier and the engine are connected to each other. The ring gear, the drive motor arranged as a second electrically operated machine, and the drive wheel are connected to each other. The sun gear and the electric generator are connected to each other. Rotation outputted from the ring gear and the drive motor is transmitted to the drive wheel and driving force is generated.

In each of the above vehicle drive units, an inverter is arranged between the drive motor and a drive motor controller as a controller for driving. This inverter is operated in accordance with a gate signal sent from the drive motor controller, and generates the electric currents of U-phase, V-phase and W-phase by receiving the direct electric current from the battery. The inverter then supplies the electric current of each phase to the drive motor, and drives the drive motor. In the hybrid type vehicle, the inverter is also arranged between the electric generator and an electric generator controller as a controller for power generation. This inverter is operated in accordance with a gate signal sent from the electric generator controller, and generates the direct electric current by operating the electric generator. This inverter then sends this direct electric current to the battery and charges the battery. This inverter further generates the electric current of each phase by receiving the direct electric current from the battery, and supplies this electric current of each phase to the electric generator and operates the electric generator.

Therefore, each of the inverters has plural transistors, e.g., six transistors. Accordingly, when the gate signal is sent to each transistor in a predetermined pattern, the transistor is turned on and off and the electric current of each phase is generated and the direct electric current is generated (e.g., see JP-A-8-88981).

In the conventional vehicle drive unit, for example, in the case of the hybrid type vehicle, the drive motor controller, the electric generator controller and each inverter are connected by a line for driving. However, when it is intended to judge whether an abnormality such as disconnection, etc. is generated in the line for driving, it is necessary to send the gate signal to each inverter.

However, the gate signal is generated by calculating a drive motor target rotating speed showing a target value of a drive motor rotating speed as a rotating speed of the drive motor, and an electric generator target rotating speed showing a target value of an electric generator rotating speed as a rotating speed of the electric generator, and sending the drive motor target rotating speed to the drive motor controller, and sending the electric generator target rotating speed to the electric generator controller. Accordingly, when the gate signal is supplied to each inverter in judging whether the abnormality is generated in the line for driving, the drive motor and the electric generator are respectively operated in accordance with the respective gate signals, and the rotation is outputted.

SUMMARY OF THE INVENTION

An exemplary embodiment of the invention addresses the above problems of the conventional vehicle drive unit, and provides an electrically operated vehicle abnormality judging device able to judge whether an abnormality is generated in the line for driving without operating the electrically operated machine and outputting the rotation.

Therefore, the electrically operated vehicle abnormality judging device of the invention comprises an electrically operated machine; a driving signal generation processing section for generating a driving signal by receiving a command value for operating the electrically operated machine; an inverter for performing a switching operation by receiving the driving signal and generating and supplying an electric current to the electrically operated machine; a line for driving for connecting the driving signal generation processing section and the inverter; a line for judgment branched from the line for driving and connected to a power source; and abnormality judgment processing means for judging whether an abnormality is generated in the line for driving on the basis of a signal of the line for judgment.

In another exemplary electrically operated vehicle abnormality judging device of the invention, the line for judgment is further constructed by a first line for judgment for connecting the line for driving and the power source, and a second line for judgment for connecting the line for driving and the ground.

In still another exemplary electrically operated vehicle abnormality judging device of the invention, a resistor is further arranged in the first and second lines for judgment, and a voltage dividing circuit is formed between the power source and the ground.

In still another exemplary electrically operated vehicle abnormality judging device of the invention, a logic circuit is further arranged in at least one of the line for driving and the line for judgment. The abnormality judgment processing means judges whether an abnormality is generated in the line for driving on the basis of the output of the logic circuit.

In still another exemplary electrically operated vehicle abnormality judging device of the invention, the logic circuit is further connected to the first line for judgment.

In still another exemplary electrically operated vehicle abnormality judging device of the invention, the signal of the line for judgment is further constructed by signals of the upper and lower stages generated every phase. The logic circuit is arranged every phase and outputs a logical sum by inputting the signals of the upper and lower stages of each phase.

Consistent with an exemplary embodiment of the invention, the electrically operated vehicle abnormality judging device comprises the electrically operated machine; the driving signal generation processing section for generating a driving signal by receiving a command value for operating the electrically operated machine; the inverter for performing a switching operation by receiving the driving signal and generating and supplying an electric current to the electrically operated machine; the line for driving for connecting the driving signal generation processing section and the inverter; the line for judgment branched from the line for driving and connected to a power source; and the abnormality judgment processing means for judging whether an abnormality is generated in the line for driving on the basis of a signal of the line for judgment.

In this case, it is not necessary to send the driving signal from the driving signal generation processing section to the inverter since it is judged whether the abnormality is generated in the line for driving on the basis of the signal of the line for judgment branched from the line for driving and connected to the power source.

Accordingly, before the command value is sent to a controller for operating the electrically operated machine, it is possible to judge whether the abnormality is generated in the line for driving without operating the electrically operated machine and outputting rotation.

DESCRIPTION OF THE EXEMPLARY EMBODIMENTS

The exemplary embodiment of the invention will next be explained in detail with reference to the drawings. In this case, a hybrid type vehicle as an electrically operated vehicle having an electric generator as a first electrically operated machine and a drive motor as a second electrically operated machine will be explained.

Figure 1:
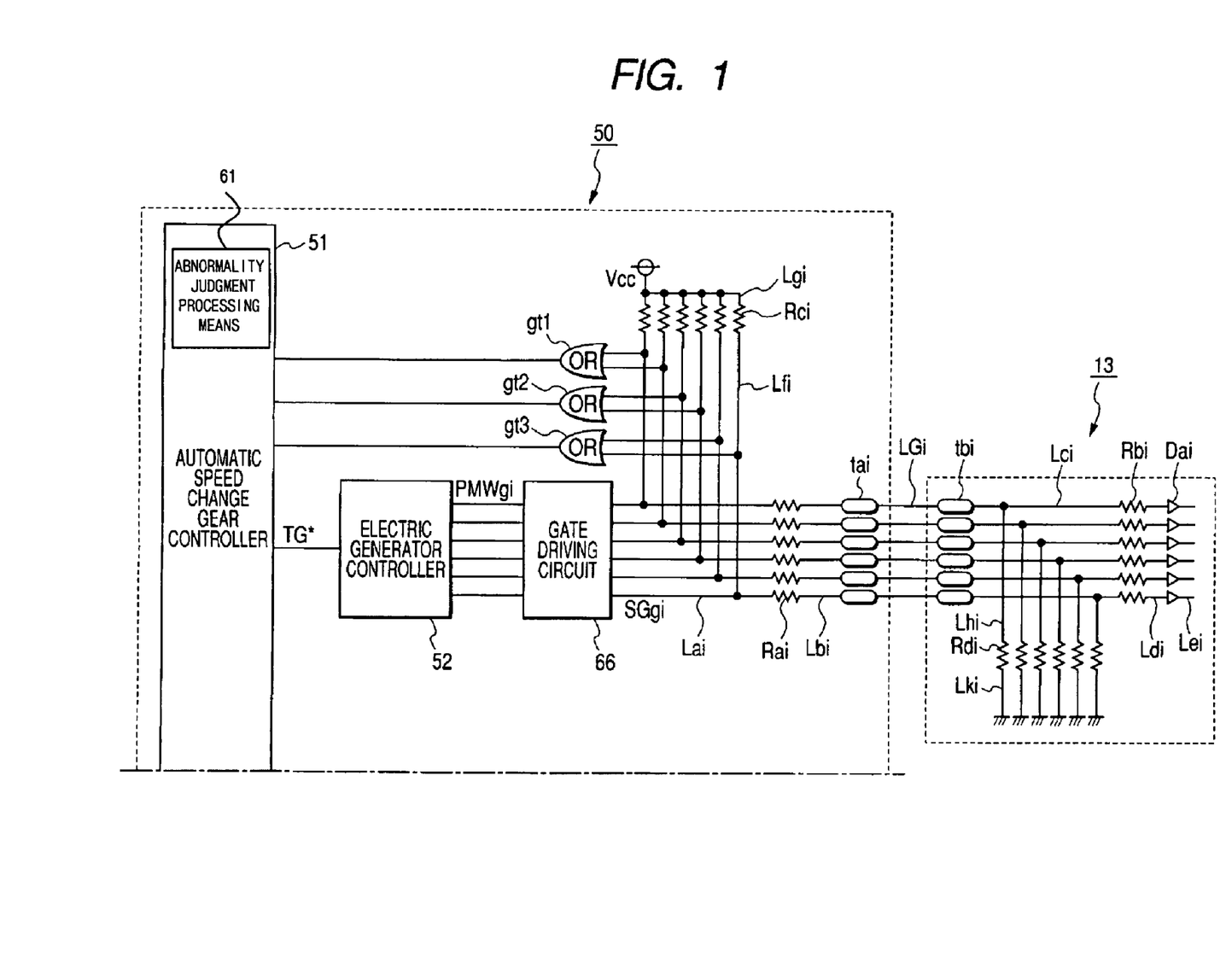
FIG. 1 is a first conceptual view showing an electrically operated vehicle abnormality judging device consistent with an exemplary embodiment of the invention.
Figure 2:
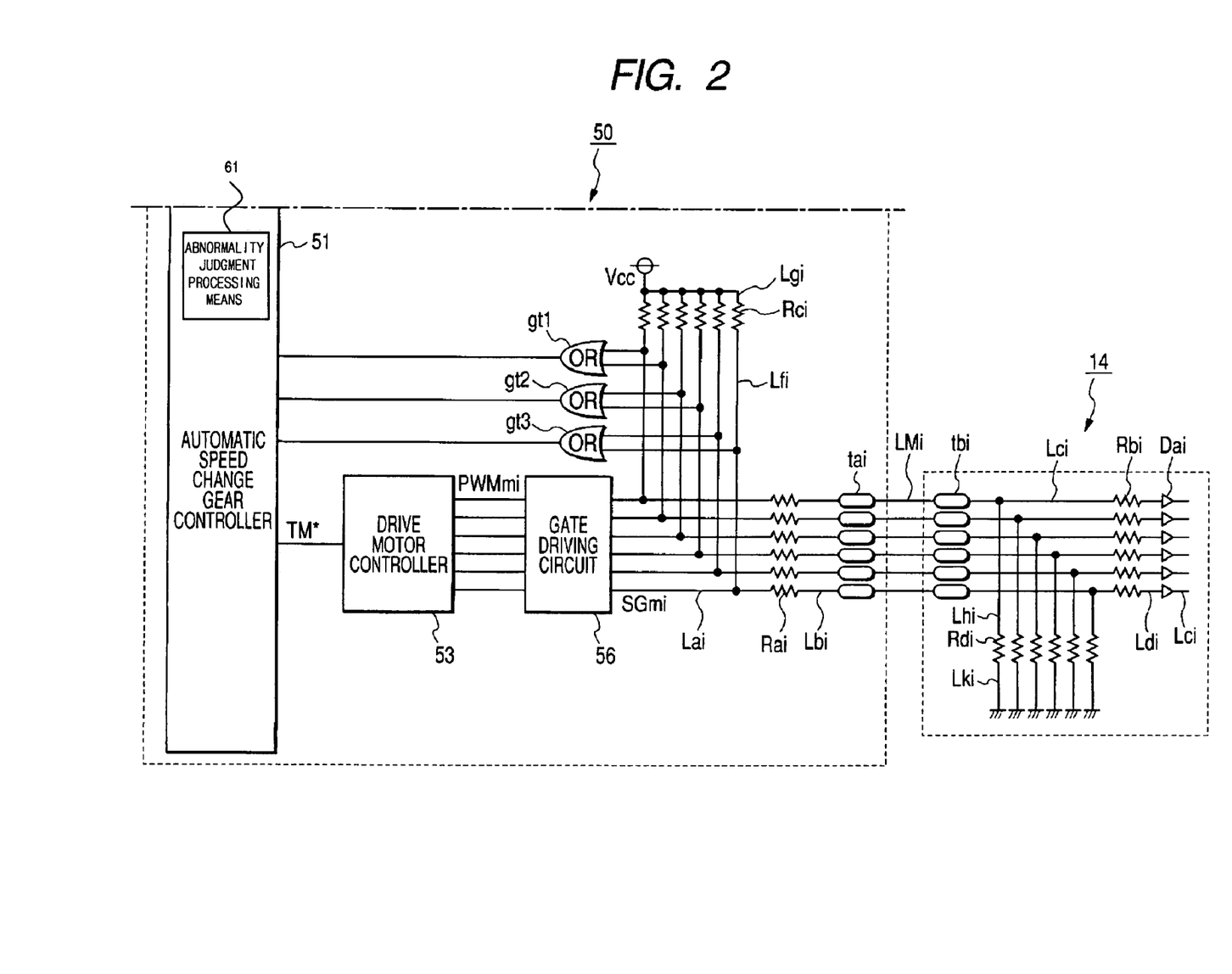
FIG. 2 is a second conceptual view showing the electrically operated vehicle abnormality judging device consistent with an exemplary embodiment of the invention.
Figure 3:
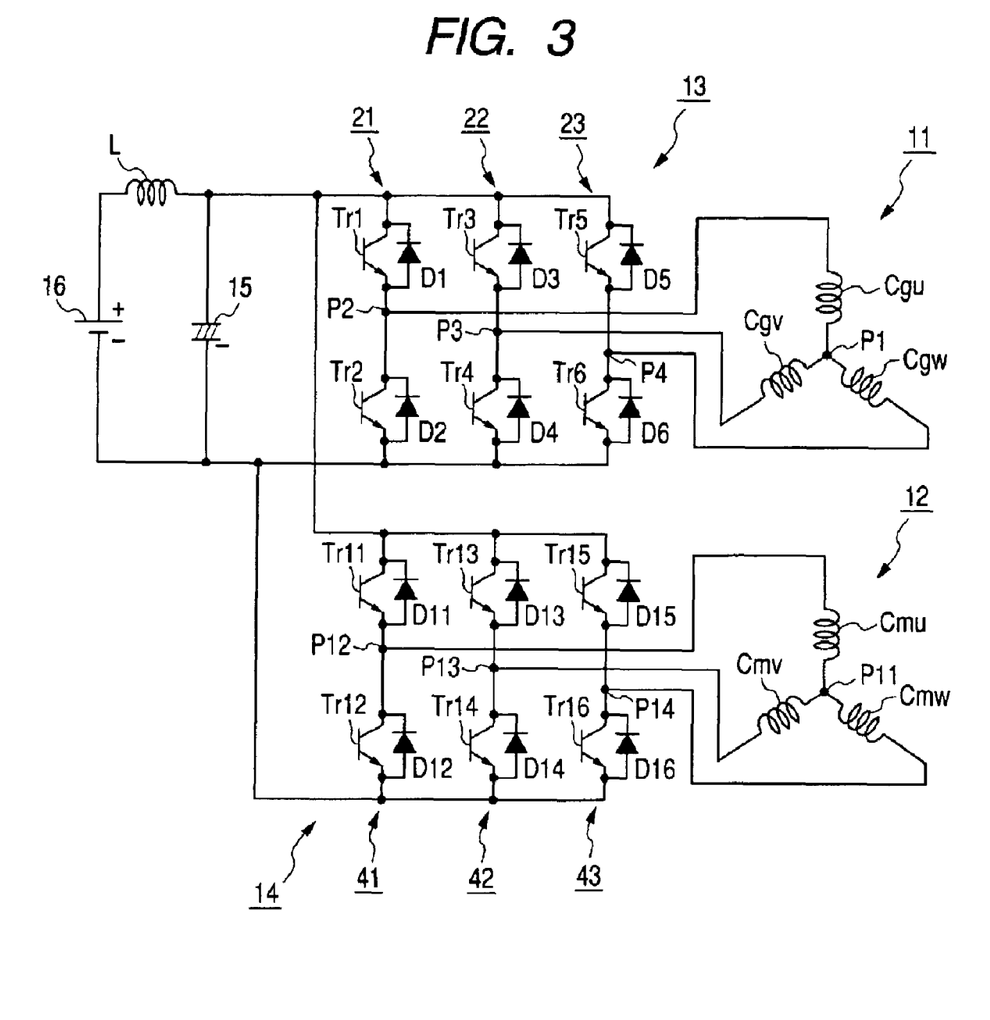
FIG. 3 is a view showing a driving system of an electric generator and a drive motor consistent with an exemplary embodiment of the invention.
Figure 4:
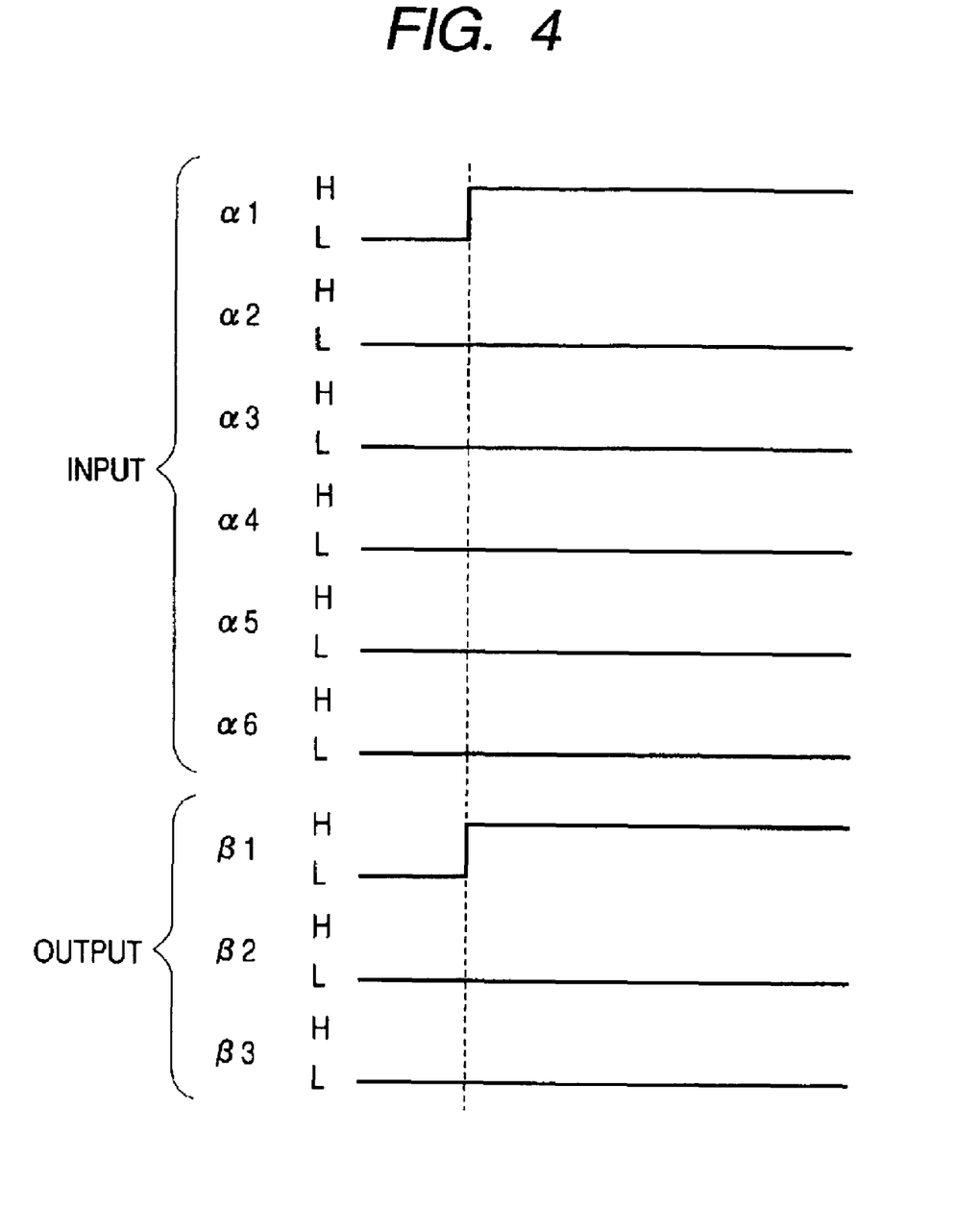
FIG. 4 is a time chart showing the operation of the electrically operated vehicle abnormality judging device consistent with an exemplary embodiment of the invention.

FIG. 1 is a first conceptual view showing an electrically operated vehicle abnormality judging device consistent with an exemplary embodiment of the invention. FIG. 2 is a second conceptual view showing the electrically operated vehicle abnormality judging device consistent with an exemplary embodiment of the invention. FIG. 3 is a view showing a driving system of the electric generator and the drive motor consistent with an exemplary embodiment of the invention. FIG. 4 is a time chart showing the operation of the electrically operated vehicle abnormality judging device consistent with an exemplary embodiment of the invention.

In FIG. 3, an electric generator 11, a drive motor 12 and a first inverter 13 for an electric generator 11 is connected to the electric generator 11. A second inverter 14 for the drive motor 12 is connected to the drive motor 12 and arranged in parallel with the first inverter 13. A common capacitor 15 for smoothing is connected to the first and second inverters 13, 14. A battery 16 is connected to the first and second inverters 13, 14 and is arranged in parallel with the capacitor 15. Reference numeral L designates an L-component of the battery 16, wiring, etc.

The electric generator 11 has stator coils Cgu, Cgv, Cgw of the U-phase, the V-phase and the W-phase and an unillustrated rotor rotatably arranged in the diametrical inner direction from the stator coils Cgu, Cgv, Cgw. The rotor has at least one of magnetic pole pairs each constructed by two poles, e.g., three magnetic pole pairs.

A direct electric current from battery 16 is converted into electric currents IGU, IGV, IGW of the U-phase, the V-phase and the W-phase by the first inverter 13 to operate the electric generator 11. The electric currents IGU, IGV, IGW of the respective phases are supplied to the respective stator coils Cgu, Cgv, Cgw. Further, the electric currents IGU, IGV, IGW of the respective phases are converted into the direct electric current by the first inverter 13 to generate power by the electric generator 11, and this direct electric current is supplied to the battery 16.

Therefore, the first inverter 13 has arms 21 to 23 of the respective phases. Transistors Tr1, Tr2 of the upper and lower stages are arranged in the arm 21. Transistors Tr3, Tr4 of the upper and lower stages are arranged in the arm 22. Transistors Tr5, Tr6 of the upper and lower stages are arranged in the arm 23. A diode Di (i=1, 2, . . . , 6) is connected between the emitter and the collector of each transistor Tri (i=1, 2, . . . , 6). A first switching element is constructed by each transistor Tri, and each transistor Tri is formed as a unit every one pair and constitutes a transistor module, Insulated Gate Bipolar Transistor (IGBT), of each phase.

A neutral point P1 of the stator coils Cgu, Cgv, Cgw and an intermediate point P2 of the transistors Tr1, Tr2 are connected by the stator coil Cgu. This neutral point P1 and an intermediate point P3 of the transistors Tr3, Tr4 are connected by the stator coil Cgv. This neutral point P1 and an intermediate point P4 of the transistors Tr5, Tr6 are connected by the stator coil Cgw.

The drive motor 12 has stator coils Cmu, Cmv, Cmw of the U-phase, the V-phase and the W-phase and an unillustrated rotor rotatably arranged in the diametrical inner direction from the stator coils Cmu, Cmv, Cmw. This rotor has at least one of magnetic pole pairs each constructed by two poles, e.g., three magnetic pole pairs.

The direct electric current from the battery 16 is converted into electric currents IMU, IMV, IMW of the U-phase, the V-phase and the W-phase by the second inverter 14 to drive the drive motor 12. The electric currents IMU, IMV, IMW of the respective phases are supplied to the respective stator coils Cmu, Cmv, Cmw.

Therefore, the second inverter 14 has arms 41 to 43 of the respective phases. Transistors Tr11, Tr12 of the upper and lower stages are arranged in the arm 41. Transistors Tr13, Tr14 of the upper and lower stages are arranged in the arm 42. Transistors Tr15, Tr16 of the upper and lower stages are arranged in the arm 43. A diode Dj (j=11, 12, . . . , 16) is connected between the emitter and the collector of each transistor Trj (j=11, 12, . . . , 16). A second switching element is constructed by each transistor Trj, and each transistor Trj is formed as a unit every one pair and constitutes a transistor module (IGBT) of each phase.

A neutral point P11 of the stator coils Cmu, Cmv, Cmw and an intermediate point P12 of the transistors Tr11, Tr12 are connected by the stator coil Cmu. The neutral point P11 and an intermediate point P13 of the transistors Tr13, Tr14 are connected by the stator coil Cmv. The neutral point P11 and an intermediate point P14 of the transistors Tr15, Tr16 are connected by the stator coil Cmw.

In the first inverter 13, each transistor Tri is turned on and off in accordance with a pulse width modulating signal PWMgi (i=1, 2, . . . , 6) of each phase generated in an electric generator controller 52 for controlling the operation of the electric generator 11. At a power applying time, each transistor Tri receives the direct electric current from the battery 16, and generates the electric currents IGU, IGV, IGW of the respective phases, and supplies the electric currents IGU, IGV, IGW of the respective phases to the electric generator 11. At a regenerative time, each transistor Tri generates the direct electric current by receiving the electric currents IGU, IGV, IGW of the respective phases from the electric generator 11, and supplies the direct electric current to the battery 16. Two pulse width modulating signals PWMgi are generated every phase, and are constructed by pulse width modulating signals of the upper and lower stages.

In the second inverter 14, each transistor Trj is turned on and off in accordance with a pulse width modulating signal PWMmi (i=1, 2, . . . , 6) of each phase generated by a drive motor controller 53 for controlling the operation of the drive motor 12. At the power applying time, each transistor Trj generates the electric currents IMU, IMV, IMW of the respective phases by receiving the direct electric current from the battery 16, and supplies the electric currents IMU, IMV, IMW of the respective phases to the drive motor 12. At the regenerative time, each transistor Trj generates the direct electric current by receiving the electric currents IMU, IMV, IMW of the respective phases from the drive motor 12, and supplies the direct electric current to the battery 16. Two pulse width modulating signals PWMmi are generated every phase, and are constructed by pulse width modulating signals of the upper and lower stages.

An unillustrated vehicle controller is arranged to control the entire operation of the hybrid type vehicle. This vehicle controller is connected to the electric generator controller 52 and the drive motor controller 53 through an automatic speed change gear controller 51 for controlling the operation of the vehicle drive unit constituting a trans-axle, and is also connected to an engine controller, etc. for controlling the operation of an unillustrated engine. In this case, a control section 50 is constructed by the automatic speed change gear controller 51, the electric generator controller 52, the drive motor controller 53, etc. A control device is constructed by the vehicle controller, the automatic speed change gear controller 51, the electric generator controller 52, the drive motor controller 53, the engine controller, etc. Each of these controllers has a recorder such as a RAM, a ROM, etc. in addition to an unillustrated CPU, and functions as a computer in accordance with a predetermined program, data, etc.

In the hybrid type vehicle, an unillustrated planetary gear unit as a differential rotating device is arranged. This planetary gear unit has a sun gear as a first differential element, a pinion engaged with this sun gear, a ring gear as a second differential element engaged with the pinion, and a carrier as a third differential element for rotatably supporting this pinion. The sun gear is mechanically connected to the electric generator 11 so as to be freely differentially rotated. The ring gear is mechanically connected to the drive motor 12 so as to be freely differentially rotated. The carrier is mechanically connected to the engine so as to be freely differentially rotated.

The vehicle controller determines vehicle request torque corresponding to a vehicle speed as unillustrated accelerator pedal, brake pedal, etc. are stepped on. When this vehicle request torque is greater than a maximum value of drive motor torque, the vehicle controller drives the engine.

The vehicle controller calculates a driver request output by multiplying the vehicle request torque and the vehicle speed, and also calculates a battery charge-discharge request output on the basis of the battery remaining amount. The vehicle controller further calculates a vehicle request output by adding the driver request output and the battery charge-discharge request output. The vehicle controller then determines a driving point of the engine as an engine target driving state on the basis of the vehicle request output and the position of the accelerator pedal. The vehicle controller also determines engine torque at the driving point as engine target torque showing a target value of the engine torque.

Subsequently, the vehicle controller reads a magnetic pole position of the rotor of the drive motor 12, and calculates an electric generator target rotating speed as a first command value by a rotating speed relation formula formed in the planetary gear unit on the basis of a drive motor rotating speed calculated from the magnetic pole position, and an engine target rotating speed showing a target value of the engine rotating speed as a rotating speed of the engine. Subsequently, the vehicle controller reads a magnetic pole position of the rotor of the electric generator 11, and calculates electric generator target torque TG* showing a target value of electric generator torque as torque of the electric generator 11 as a second command value on the basis of an electric generator rotating speed calculated from the magnetic pole position, and the electric generator target rotating speed. The vehicle controller then sends the electric generator target torque TG* to the electric generator controller 52 through the automatic speed change gear controller 51.

An unillustrated electric generator control processing means of the electric generator controller 52 operates the electric generator 11 in accordance with the electric generator target torque TG* by performing electric generator control processing.

Further, when the vehicle controller reads the electric generator target torque TG* and operates the electric generator 11 on the basis of the electric generator target torque TG*, the vehicle controller presumes torque generated in the output shaft of the drive motor 12 as drive shaft torque, and subtracts the drive shaft torque from the vehicle request torque. Thus, the vehicle controller calculates drive motor target torque TM* as a third command value showing a target value of the drive motor torque, and sends this drive motor target torque TM* to the drive motor controller 53 through the automatic speed change gear controller 51.

An unillustrated drive motor control processing means of the drive motor controller 53 drives the drive motor 12 in accordance with the drive motor target torque TM* by performing drive motor control processing.

In the drive motor controller 53, feedback control is set to be performed in a d-q axis model in which a d-axis is set to the direction (magnetic flux direction) of a magnetic pole pair of the rotor and a q-axis is set to the direction (direction advanced by 90 degrees in the positive rotating direction of the drive motor 12 with respect to the d-axis) perpendicular to the d-axis. Therefore, when the drive motor control processing means reads the drive motor target torque TM*, this drive motor control processing means determines a d-axis electric current command value id* showing a d-axis component of an electric current command value "is" represented by a vector and a q-axis electric current command value iq* showing a q-axis component by referring to an electric current command value map recorded to the recorder of the drive motor controller 53.

On the other hand, an unillustrated electric current sensor for detecting the electric currents IMU, IMV, IMW, and an unillustrated resolver for detecting the magnetic pole position of the rotor are arranged in the drive motor 12. The drive motor control processing means performs three-phase/two-phase conversion processing on the basis of the detected electric currents IMU, IMV, IMW and the magnetic pole position, and converts the electric currents IMU, IMV, IMW into a d-axis electric current id and a q-axis electric current iq.

The drive motor control processing means generates a d-axis voltage command value vd* on the basis of the electric current deviation between the d-axis electric current id and the d-axis electric current command value id*, and also generates a q-axis voltage command value vq* on the basis of the electric current deviation between the q-axis electric current iq and the q-axis electric current command value iq*. Further, the drive motor control processing means performs two-phase three-phase conversion processing on the basis of the d-axis voltage command value vd*, the q-axis voltage command value vq* and the magnetic pole position, and converts the d-axis voltage command value vd* and the q-axis voltage command value vq* into voltage command values vu*, vv*, vw* of the respective phases.

Subsequently, the drive motor control processing means performs pulse width conversion processing, and generates the pulse width modulating signal PWMmi of each phase on the basis of the voltage command values vu*, vv*, vw* of the respective phases and a direct current voltage Vdc detected by an unillustrated battery sensor, and sends this pulse width modulating signal PWMmi to a gate driving circuit 56 as a driving signal generation processing section for the drive motor 12.

The gate driving circuit 56 generates a gate signal SGmi (i=1, 2, . . . , 6) as a driving signal for the drive motor 12 every phase by receiving the pulse width modulating signal PWMmi, and sends this gate signal SGmi to the second inverter 14. Two gate signals SGmi are generated every phase correspondingly to the pulse width modulating signal PWMmi of each phase and are constructed by gate signals of the upper and lower stages.

In the second inverter 14, the transistor Trj is turned on and off and switched by receiving the gate signal SGmi, and the electric currents IMU, IMV, IMW of the respective phases are generated.

The control section 50 and the second inverter 14 are connected to each other by a line LMi (i=1, 2, . . . , 6) constructed by a wire harness to send the gate signal SGmi to the second inverter 14. Therefore, a connecting terminal tai (i=1, 2, . . . , 6) is arranged in the control section 50, and a connecting terminal tbi (i=1, 2, . . . , 6) is arranged in the second inverter 14. The connecting terminals tai and tbi are connected to each other.

The gate driving circuit 56 and the connecting terminal tai are connected to each other through a line Lai (i=1, 2, . . . , 6), a resistor Rai (i=1, 2, . . . , 6) and a line Lbi (i=1, 2, . . . , 6) within the control section 50. The connecting terminal tbi and each transistor Trj are connected to each other through a line Lci (i=1, 2, . . . , 6), a resistor Rbi (i=1, 2, . . . , 6), a line Ldi (i=1, 2, . . . , 6), a diode Dai (i=1, 2, . . . , 6) and a line Lei (i=1, 2, . . . , 6) within the second inverter 14.

In the automatic speed change gear controller 51, it is possible to judge whether an abnormality such as disconnection, etc. is generated in the line LMi.

Therefore, the line Lai and a power source Vcc are connected to each other through a line Lfi (i=1, 2, . . . , 6), a resistor Rci for pull-up (i=1, 2, . . . , 6) and a line Lgi (i=1, 2, . . . , 6) within the control section 50. The line Lci and the ground are connected to each other through a line Lhi (i=1, 2, . . . , 6), a resistor Rdi (i=1, 2, . . . , 6) and a line Lki (i=1, 2, . . . , 6) within the second inverter 14.

As its result, the power source Vcc and the ground are connected to each other by the line Lgi, the resistor Rci, the lines Lfi, Lai, the resistor Rai, the line Lbi, the connecting terminal tai, the line LMi, the connecting terminal tbi, the lines Lci, Lhi, the resistor Rdi and the line Lki. A voltage dividing circuit for dividing the voltage of the power source Vcc is formed by the resistor Rci and two resistors Rai, Rdi connected in series.

A line for driving is constructed by the lines Lai, Lbi, LMi, Lci, Ldi, Lei. A first line for judgment is constructed by lines Lfi, Lgi branched from the line Lai. A second line for judgment is constructed by lines Lhi, Lki branched from the line Lci.

OR circuits (OR) gt1 to gt3 as logic circuits are arranged between the automatic speed change gear controller 51 and the line Lfi. An input terminal of the OR circuit gt1 is connected to lines Lf1, Lf2 of the upper and lower stages of the U-phase. An output terminal of the OR circuit gt1 is connected to an unillustrated port of the automatic speed change gear controller 51. An input terminal of the OR circuit gt2 is connected to lines Lf3, Lf4 of the upper and lower stages of the V-phase. An output terminal of the OR circuit gt2 is connected to the port. An input terminal of the OR circuit gt3 is connected to lines Lf5, Lf6 of the upper and lower stages of the W-phase. An output terminal of the OR circuit gt3 is connected to the port.

In this case, when the line LMi is normally connected, a voltage Vfi (i=1, 2, . . . , 6) divided in the line Lfi $$Vfi=Vcc\cdot(Rai+Rdi)/(Rci+Rai+Rdi)$$

is generated. However, in the exemplary embodiment, since the resistance value of the resistor Rci is set to be sufficiently large, the voltage Vfi becomes a value close to 0[V] and an input αi (i=1, 2, . . . , 6) of each of the OR circuits gt1 to gt3 becomes a low level. As its result, outputs β1 to β3 of a logical sum of each of the OR circuits gt1 to gt3 become a low level.

In contrast to this, when a predetermined line LMi is disconnected, an undivided voltage Vfi $$Vfi=Vcc$$

is generated in the line Lfi corresponding to the disconnected line LMi, and a predetermined input among the respective OR circuits gt1 to gt3 becomes a high level. As its result, the output of the corresponding logical sum of each of the OR circuits gt1 to gt3 becomes the high level.

Therefore, an abnormality judgment processing means 61 of the automatic speed change gear controller 51 performs abnormality judgment processing and judges whether an abnormality is generated in the line for driving. Namely, the abnormality judgment processing means reads the outputs β1 to β3 of the OR circuits gt1 to gt3, and judges whether a predetermined output is at the high level. When the predetermined output is at the high level, the abnormality judgment processing means judges that one of the lines LMi of the corresponding phase is disconnected and an abnormality is generated.

When an unillustrated driving stoppage processing means of the automatic speed change gear controller 51 then performs driving stoppage processing and judges that the abnormality is generated in one of the lines LMi, the driving stoppage processing means sends a driving stoppage signal to the drive motor controller 53. This drive motor controller 53 generates a gate interrupting signal and sends this gate interrupting signal to the gate driving circuit 56. As its result, the gate driving circuit 56 interrupts all gate signals SGmi and stops the operation of the drive motor 12. A signal for judgment is constructed by the input $\alpha i$ inputted to the OR circuits gt1 to gt3. In this case, the signal for judgment is generated every phase and is constructed by signals of the upper and lower stages.

In the exemplary embodiment, the OR circuits gt1 to gt3 are connected to the line Lfi, but can be arranged in at least one of lines Lfi, Lai, Lbi, LMi, Lci, Lhi.

On the other hand, in the electric generator controller 52, the electric generator control processing means similarly generates a pulse width modulating signal PWMgi of each phase, and sends this pulse width modulating signal PWMgi to a gate driving circuit 66 as a driving signal generation processing section for the electric generator 11.

The gate driving circuit 66 generates a gate signal SGgi (i=1, 2, . . . , 6) as a driving signal for the electric generator 11 every phase by receiving the pulse width modulating signal PWMgi, and sends this gate signal SGgi to the first inverter 13. The gate signal SGgi corresponds to the pulse width modulating signal PWMgi every phase, and is constructed by gate signals of the upper and lower stages.

Further, in the first inverter 13, the transistor Tri is turned on and off and is switched by receiving the gate signal SGgi, and the electric currents IGU, IGV, IGW of the respective phases are generated.

The control section 50 and the first inverter 13 are connected to each other by a line Lgi (i=1, 2, . . . , 6) constructed by a wire harness to send the gate signal SGgi to the first inverter 13. Therefore, the connecting terminal tai is arranged in the control section 50, and the connecting terminal tbi is arranged in the first inverter 13. The connecting terminals tai, tbi are connected to each other.

The gate driving circuit 66 and the connecting terminal tai are connected to each other through the line Lai, the resistor Rai and the line Lbi within the control section 50. The connecting terminal tbi and each transistor Tri are connected to each other through the line Lci, the resistor Rbi, the line Ldi, the diode Dai and the line Lei within the first inverter 13.

In the automatic speed change gear controller 51, it is possible to judge whether an abnormality such as disconnection, etc. is generated in the line LGi. Therefore, the line Lai and the power source Vcc are connected to each other through the line Lfi, the resistor Rci for pull-up and the line Lgi within the control section 50. The line Lci and the ground are connected to each other through the line Lhi, the resistor Rdi and the line Lki within the first inverter 13.

As its result, the power source Vcc and the ground are connected to each other by the line Lgi, the resistor Rci, the lines Lfi, Lai, the resistor Rai, the line Lbi, the connecting terminal tai, the line LGi, the connecting terminal tbi, the lines Lci, Lhi, the resistor Rdi and the line Lki. A voltage dividing circuit for dividing the voltage of the power source Vcc is formed by the resistor Rci and two resistors Rai, Rdi connected in series.

A line for driving is constructed by the lines Lai, Lbi, LGi, Lci, Ldi, Lei. A first line for judgment is constructed by lines Lfi, Lgi branched from the line Lai. A second line for judgment is constructed by lines Lhi, Lki branched from the line Lci.

OR circuits (OR) gt1 to gt3 as logic circuits are arranged between the automatic speed change gear controller 51 and the line Lfi. The abnormality judgment processing means reads outputs $\beta 1$ to $\beta 3$ of a logical sum of the OR circuits gt1 to gt3, and judges whether a predetermined output is at a high level. When the predetermined output is at the high level, the abnormality judgment processing means judges that one of the lines LGi of the corresponding phase is disconnected and an abnormality is generated.

Next, when the driving stoppage processing means judges that an abnormality is generated in one of the lines LGi, the driving stoppage processing means sends a driving stoppage signal to the electric generator controller 52. The electric generator controller 52 generates a gate interrupting signal and sends this gate interrupting signal to the gate driving circuit 66. As its result, the gate driving circuit 66 interrupts all the gate signals SGgi and stops the operation of the electric generator 11. A signal for judgment is constructed by an input $\alpha i$ inputted to the OR circuits gt1 to gt3. In this case, the signal for judgment is generated every phase, and is constructed by signals of the upper and lower stages.

In the exemplary embodiment, the OR circuits gt1 to gt3 are connected to the line Lfi, but can be arranged in at least one of lines Lfi, Lai, Lbi, LGi, Lci, Lhi.

Thus, it is sufficient to read the outputs $\beta 1$ to $\beta 3$ of the respective OR circuits gt1 to gt3 to judge whether an abnormality is generated in lines LGi, LMi. Hence, it is not necessary to send gate signals SGgi, SGmi from the gate driving circuits 66, 56 to the first and second inverters 13, 14.

Accordingly, before the electric generator target torque TG* is sent to the electric generator controller 52 and the drive motor target torque TM* is sent to the drive motor controller 53, it is possible to judge whether an abnormality is generated in lines LGi, LMi without operating the electric generator 11 and the drive motor 12 and outputting rotation.

The invention is not limited to the above exemplary embodiment, but can be variously modified consistent with the purpose of the invention as would be understood by those skilled in the art, and these modifications are not excluded from the scope of the invention.

What is claimed is:

1. An electrically operated vehicle abnormality judging device comprising:
    an electrically operated machine;
    a driving signal generation processing section operable to generate a driving signal by receiving a command value for operating the electrically operated machine;
    an inverter operable to perform a switching operation by receiving said driving signal and generating and supplying an electric current to said electrically operated machine;
    a line for driving for connecting said driving signal generation processing section and the inverter;
    lines for judgment comprising:
        a first line for judgment, branched from the line for driving to a power source, connecting the line for driving to the power source; and a second line for judgment for connecting said line for driving and a ground; and an abnormality judgment processing means operable to judge whether an abnormality is generated in said line for driving on the basis of a signal of the line for judgment;

wherein said abnormality judgment processing means judges whether an abnormality is generated in said line for driving by monitoring voltages generated in the first line for judgment; and wherein said lines for judgment makes the line for judgment and the lines for driving generate voltages by connecting the power source to the line for driving.

2. The electrically operated vehicle abnormality judging device according to claim 1, further comprising:

a resistor arranged in said first and second lines for judgment; and a voltage dividing circuit which is formed between said power source and the ground.

3. The electrically operated vehicle abnormality judging device according to claim 1, further comprising:

a logic circuit arranged in at least one of said line for driving and the first line for judgment, and wherein said abnormality judgment processing means judges whether an abnormality is generated in the line for driving on the basis of the output of said logic circuit.

4. The electrically operated vehicle abnormality judging device according to claim 3, wherein said logic circuit is connected to the first line for judgment.

5. The electrically operated vehicle abnormality judging device according to claim 3, wherein the signal of said lines for judgment comprises signals of a upper and a lower stage generated every phase, and wherein said logic circuit is arranged every phase and outputs a logical sum by inputting the signals of the upper and lower stages of each phase.

* * * * *